(12) United States Patent
Chang

(10) Patent No.: US 7,028,299 B1
(45) Date of Patent: Apr. 11, 2006

(54) TASK-BASED MULTIPROCESSING SYSTEM

(75) Inventor: Stephen S. Chang, Glendora, CA (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 09/608,869

(22) Filed: Jun. 30, 2000

(51) Int. Cl.
*G06F 9/46* (2006.01)

(52) U.S. Cl. ..................... 718/104; 718/102; 718/107; 707/8; 707/9

(58) Field of Classification Search ............... 709/100, 709/103, 107; 711/108, 143, 144, 147, 148, 711/154; 707/8, 9; 718/100, 102, 103, 104, 718/107
See application file for complete search history.

(56) References Cited

U.S. PATENT DOCUMENTS

| | | | | |
|---|---|---|---|---|
| 4,697,266 A | * | 9/1987 | Finley | 714/16 |
| 5,138,696 A | * | 8/1992 | Nagata | 358/1.11 |
| 5,404,482 A | * | 4/1995 | Stamm | 711/144 |
| 5,404,483 A | * | 4/1995 | Stamm | 711/144 |
| 5,832,484 A | * | 11/1998 | Sankaran et al. | 707/8 |
| 5,918,248 A | * | 6/1999 | Newell et al. | 711/147 |
| 6,128,307 A | * | 10/2000 | Brown | 370/412 |
| 6,173,385 B1 | * | 1/2001 | Tuma et al. | 711/219 |
| 6,496,848 B1 | * | 12/2002 | Nankaku | 718/100 |
| 6,567,840 B1 | * | 5/2003 | Binns et al. | 718/103 |
| 6,681,239 B1 | * | 1/2004 | Munroe et al. | 718/104 |

* cited by examiner

*Primary Examiner*—Majid Banankhah
(74) *Attorney, Agent, or Firm*—Blakely, Sokoloff, Taylor and Zafman

(57) ABSTRACT

An embodiment of the present invention is a task manager to manage tasks in a multiprocessor system. A task table stores task entries corresponding to tasks executed by at least one processor. A block allocation circuit allocates blocks of the cache memory used by the tasks. A task coordinator coordinates the tasks in response to a task cycle issued by a processor.

30 Claims, 6 Drawing Sheets

| STATUS 420 | TASK ID 430 | START ADDRESS 440 | TASK BLOCK SIZE 450 | CACHE ADDRESS 460 |
|---|---|---|---|---|
| INVALID | X | X | X | X |
| SHARED | 00100 | 0100 0000 | 0000 1000 | 000100 |
| ... | ... | ... | ... | ... |
| EXCLUSIVE | 00080 | 0040 0000 | 0000 0100 | 006800 |

*FIG. 4*

TASK-BASED MULTIPROCESSING SYSTEM

BACKGROUND

1. Field of the Invention

This invention relates to microprocessors. In particular, the invention relates to multiprocessing systems.

2. Description of Related Art

A typical multiprocessor system has a number of processors running in parallel. By decomposing a large problem into smaller tasks and allowing these tasks to be executed by concurrent processors, a significant speed improvement is achieved. There are, however, many challenges facing multiprocessor design. Examples of these challenges include cache coherency, snooping protocol, task allocation, communication, and parallel compilers.

Current microprocessors having internal cache memories typically snoop internal caches for cacheable cycles seen on the multiprocessor bus. All cacheable agents have to complete the snoop activities before the cacheable cycle can complete. The snoop activities are often delayed because of slow tag timing or conflicts with on-going internal tag accesses.

Therefore, there is a need to have an efficient mechanism to support task execution in a multiprocessing environment.

BRIEF DESCRIPTION OF THE DRAWINGS

The features and advantages of the present invention will become apparent from the following detailed description of the present invention in which:

FIG. 4 is a diagram illustrating a task table shown in FIG. 2 according to one embodiment of the invention.

DESCRIPTION

An embodiment of the present invention is a task manager to manage tasks and maintain cache coherency on blocks of data associated with tasks in a multiprocessor system. A task table stores task entries corresponding to tasks executed by at least one processor. A block allocation circuit allocates blocks of the cache memory used by the tasks. A task coordinator coordinates the tasks in response to a task cycle issued by a processor.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

In a multiprocessor system, operating system distributes tasks to different processors to maximize parallelism. Tasks are partitioned program routines that can be executed in parallel. They are managed by the operating system through a table called "task table". The task table contains the states of active tasks. The state information is used by the operating system to determine the scheduling and resource sharing of tasks. The invention proposes a multiprocessor system architecture that performs transactions and maintains cache coherency on task basis instead of on cache line basis. The architecture provides a task table in the processor and associates each task with a cache state. It also changes the bus protocol to handle task-based transactions.

A task is a partitioned program routine that can be viewed as an instruction block with or without a data block. A task may be partitioned into an instruction block and a data block. A block or task is the base unit for task transactions and task table. Each block is contiguous cache lines defined by a start address and the data block size. As the tasks are distributed to different processors, the processor records the tasks in its cache. A cache state is attached to the task. For example, a task that is an instruction block may be recorded as "Shared" since it can be shared as read-only data by other processors. On the other hand, a task that is a data block may be recorded as "Exclusive" because the processor may modify it. With the task table, cache coherency can be performed on the tasks using the conventional Modified Exclusive Shared Invalid (MESI) cache protocol. The processors can snoop a task cycle on the bus, and check to see if it is recorded in the task table. If a task cycle "hits" the task table, then the processor can use the cache state to decide how it should respond to the cycle. Only one snoop activity is required for each task cycle, and that each task may contain N cache lines. Therefore, the snoop activities from are reduced from N to one.

Figure 1:
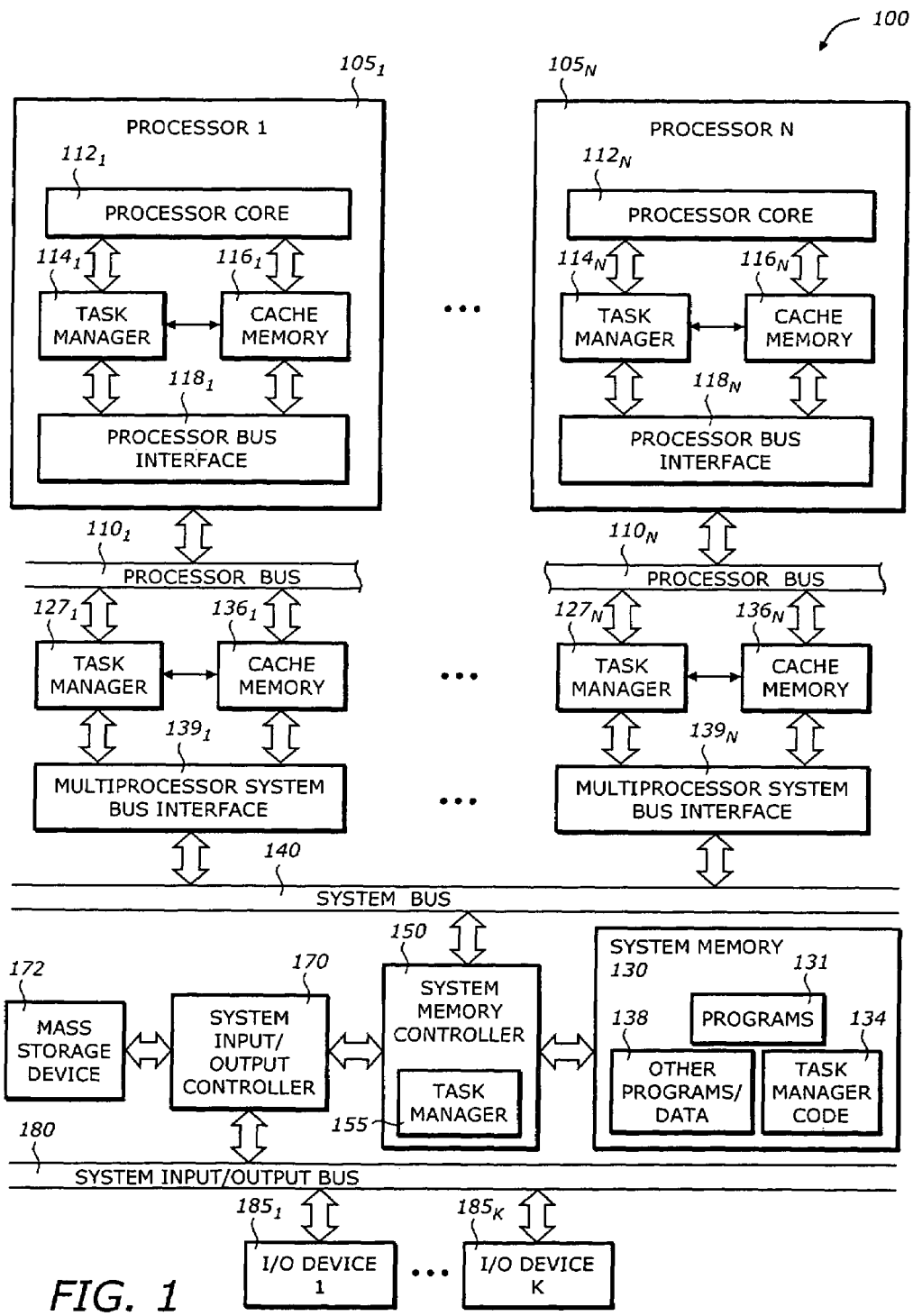
FIG. 1 is a diagram illustrating a system in which one embodiment of the invention can be practiced.

FIG. 1 is a diagram illustrating a computer system 100 according to one embodiment of the present invention. The computer system 100 includes N processors $105_1$ to $105_N$, N processor buses $110_1$ to $110_N$ corresponding to the N processors $105_1$ to $105_N$ respectively, N task managers $127_1$ to $127_N$, N cache memories $136_1$ to $136_N$, N multiprocessor system bus interfaces 139, to $139_N$ a system bus 140, a system memory controller 150, a main memory 160, a system input/output (I/O) controller 170, a mass storage device 172, a system input/output bus 180, and K I/O devices $185_1$ to $185_K$.

Each of the processors $105_1$ to $105_N$ represents a central processor of any type of architecture, such as complex instruction set computers (CISC), reduced instruction set computers (RISC), very long instruction word (VLIW), or hybrid architecture. The processors $105_1$ to $105_N$ may have the same or different architectures but they all support the task-based processing protocol. For illustrative purposes, only the processor $105_1$ is described. The processor $105_1$ includes a processor core 112, a task manager 114, and a cache memory 116, and a processor bus interface 118. The processor core 112 includes the core circuitry of the processor such as an instruction decoder, arithmetic and logic unit, instruction issuing unit, etc. The task manager 114 may be referred to as internal task manager. It manages the tasks executed by the processor $105_1$. The cache memory 116 may contain program and data, and data blocks used by the task manager 114. The cache memory 116 is also referred to as the internal cache or level 1 (L1) cache. The processor $105_1$, the task manager 114, and the cache memory 116 interface with the processor bus 110 via the processor bus interface 118.

The processor bus 110 allows the processor 105 to access the task manager 127 and the cache memory 136. There are also other normal activities on the processor bus 110. The task manager 127 may be referred to as external task manager. It manages the tasks in conjunction with the cache memory 136. The cache memory 136 is also referred to as the external cache or level 2 (L2) cache with respect to the processor 105. The multiprocessor system bus interface 139 allows the task manager 127, the cache memory 136, and the processor 105 to access to the system bus 140.

The system bus 140 is a multiprocessor bus to allow N processors $105_1$ to $105_N$ to access the main memory 160 and to perform other bus-related activities such as broadcasting cycles, decoding cycles, snooping, etc. The system memory controller 150 controls the use of the main memory 130 and has an interface to the system I/O controller 170. The system memory controller 125 may additionally contain a task manager 155. The task manager 155 is optional and may be used for a multiple multiprocessor systems. The task manager 155 is essentially similar to the task managers 114 and 127. The task table associated with the task manager 155 may be located inside the task manager 155 or outside the system memory controller 150. The main memory 130 represents one or more mechanisms for storing information. For example, the main memory 130 may include non-volatile or volatile memories. Examples of these memories include flash memory, read only memory (ROM), or random access memory (RAM). The system main memory 130 may contain a task manager code 134 to support the task manager 114, and/or 127, and/or 155, a program 131 and other programs and data 138. Of course, the main memory 130 preferably contains additional software (not shown), which is not necessary to understanding the invention.

The system I/O controller 170 provides interface to I/O devices and the system I/O bus 180. The mass storage devices 172 include CD ROM, floppy diskettes, and hard drives. The system I/O bus 180 provides high-speed I/O accesses. An example of the system I/O bus 180 is the Peripheral Component Interconnect (PCI) bus. The I/O device $185_1$ to $185_K$ are peripheral devices performing dedicated tasks. Examples of the I/O devices include direct memory access controller (DMAC), input/output processors (IOP), network interface and media interface devices. The network interface connects to communication networks such as the Internet. The Internet provides access to on-line service providers, Web browsers, and other network channels. The media interface provides access to audio and video devices.

The task managers 110, 127 and 155 may be implemented by hardware, firmware, software or any combination thereof. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information such as the mass storage devices 172. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

All or part of the task manager and/or task coordinator may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Figure 2A:
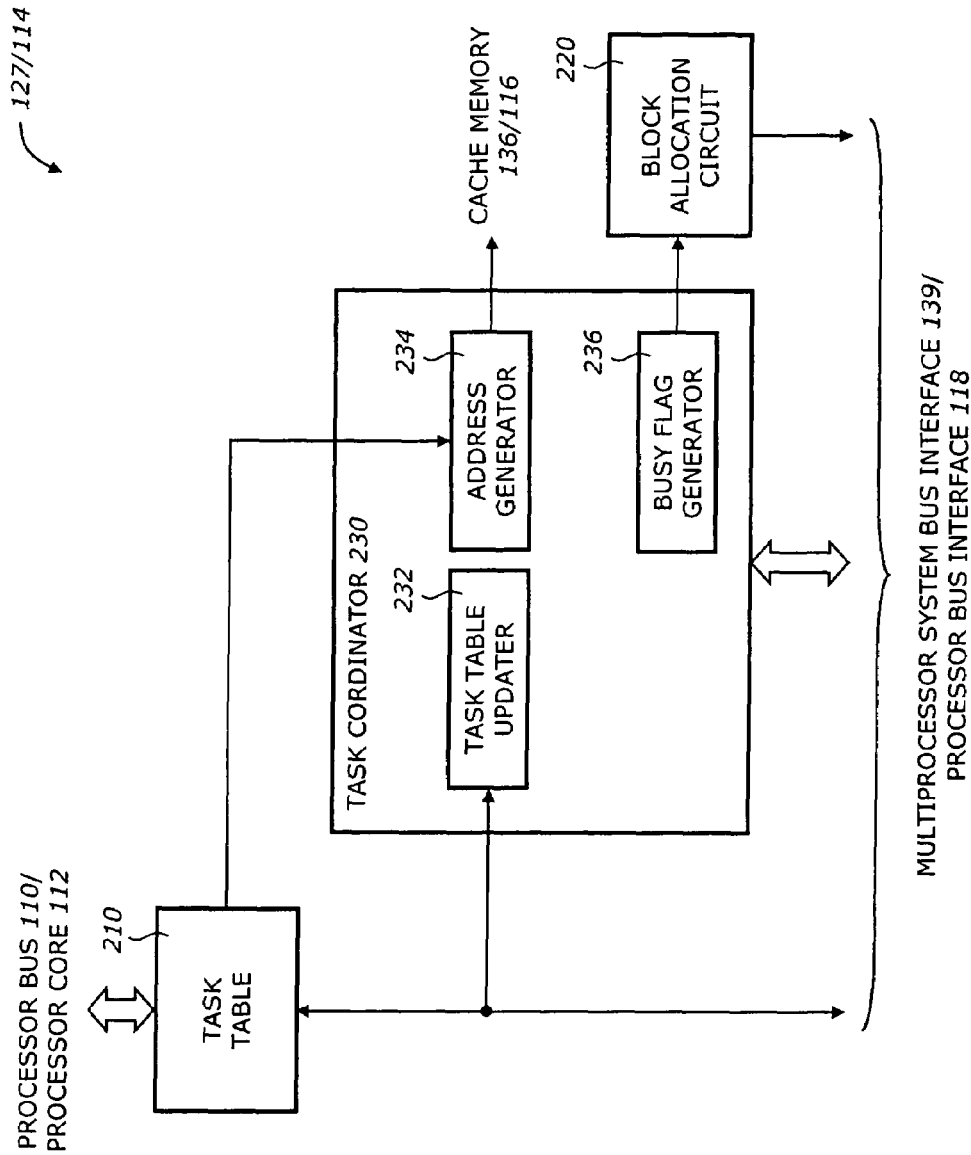
FIG. 2A is a diagram illustrating a task manager according to one embodiment of the invention.

FIG. 2A is a diagram illustrating the task manager 114 or 127 shown in FIG. 1 according to one embodiment of the invention. The task manager 114 includes a task table 210, a block allocation circuit 220, and a task coordinator 230.

The internal task manager 114 and external task manager 127 are essentially similar. The main difference is the interface circuitry to the bus and the memory. The task table 210 stores task entries corresponding to tasks executed at least one of the processors $105_1$ to $105_N$. The task table 210 provides a means to keep track of the tasks obtained or executed by the processors $105_1$ to $105_N$. As will be described later, each task entry has a task identifier (ID) that uniquely identify a task. The task table 210 may be implemented as a fully associative memory.

The block allocation circuit 220 allocates blocks of the cache memory used by the tasks. The block allocation circuit 220 is interfaced to the bus interface 205 and the internal cache memory 116 or the external cache memory 136. The block allocation circuit 220 monitors the usage of data blocks in the cache memory 116 or 136 and locates available blocks when requested by a task. When a new task is broadcast on the system bus 140, the processors compete with one another to acquire the task. The availability of free, uncommitted resources and task priority setting in a processor affects how fast it can obtain the task. The block allocation circuit 220 searches for a free block of cache that satisfies the task requirement.

The task coordinator 230 coordinates the tasks in response to a task cycle issued by at least one of the processors $110_1$ to $110_N$. The task coordinator 230 interfaces to the processor core 112 and the internal cache memory 116 or the external cache memory 136 to coordinate activities of the tasks. The task coordinator 230 include a task table updater 232, an address generator 234, and a busy flag generator 236.

The task table updater 232 is responsible for updating the task table 210 when new tasks are acquired. The updating includes writing information about a task entry to the task table 210. The task table updater 232 also reads the task table 210 to determine the status of a particular task. Upon detection of a task cycle on the bus, the task table updater 232 compares the task ID associated with the detected task cycle with those task ID's in the task table 210 to determine if there is a hit. The address generator 234 generates address to the cache memory 116 or 136. The address generator 234 is initially loaded with the starting address of the data block associated with the task and points to or indexes to the physical locations of the corresponding cache memory 116 or 136. As will be explained later, the starting address of the data block is stored in the task table 210 when the task is first acquired by the processor. When the task manager 230 is used for internal cache memory 116, the address generator 234 includes a program counter to keep track of the address of the instruction being executed and a data counter to point to the data. The busy flag generator 236 provides busy flag signals and a search start/end signal to the block allocation circuit 220. Each of the busy flag signals corresponds to a chunk of memory in the cache memory 116 or 136. If the chunk of memory is in use, the corresponding flag signal is asserted, otherwise it is de-asserted. The search start/end signal is used to initiate a search for free blocks when a task requires data block (for internal task controller 114) or the host bridge chipset 120 or the external processor bus 110 (for external task controller 127).

Figure 2B:
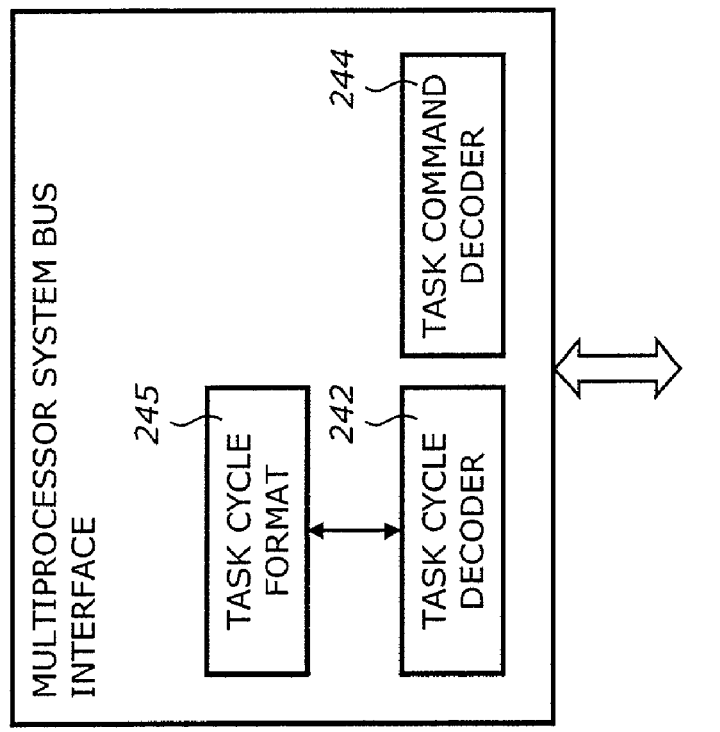
FIG. 2B is a diagram illustrating a multiprocessor system bus interface according to one embodiment of the invention.

FIG. 2B is a diagram illustrating the multiprocessor system bus interface 139 shown in FIG. 1 according to one embodiment of the invention.

The multiprocessor system bus interface 139 provides interface to the system bus 140. The processor interface 240 includes a task cycle decoder 242 and a task command decoder 244. The task cycle decoder 242 decodes cycle signals generated by the processor core 112 or broadcast or directs to a specific processor on the system bus 140 when a cycle is initiated. A processor cycle may be task related or non-task related. A non-task related cycle is treated as a normal cycle and is handled in the normal processing sequence. A task related cycle contain task information according to a task cycle format 245. The task command decoder 244 decodes the task command in the task cycle and provides appropriate action according to the decoded command.

In addition to the task table, a bus protocol is developed to handle tasks efficiently. A task cycle transfers the information and data of a task on the system bus. The task identifier (ID) is divided into two phases: request phase and data phase. The request phase carries the task command, address and block size information. The task ID and a unique transaction ID are attached to the request phase. The data phase transfers the data associated with the task. It is also attached with the transaction ID, and is de-coupled from the request phase. The length of the data phase is determined by the data block size. To balance the bus bandwidth use by different processors, the data phase may be interrupted by another processor requesting data transfer. An interrupted data transfer can later resume and be picked up by the owner based on the transaction ID. If processor 1 issues a task cycle that matches a task ID in the processor 2's task table, processor 2 is required to check the cache state in the task table and perform cache coherency activities. This may include update cache state, drive appropriate snoop response, and execute write back cycles. If processor 2 is still performing data transfer for the task, processor 2 remembers the required coherency activities and carry them out in appropriate time. The main memory may also contain a task table that tracks all the tasks acquired by the processors. The main memory task table allows the elimination of snoop phase and simplifies the bus protocol to only request and data phases. In addition, the table also acts as snoop filter in a multi system bus design. Since cache coherency is done by communicating with task cycles, it is important to maintain consistency of data block size of a task throughout the system until the task is invalidated. Single cache line cycles are still allowed in the system. Single cache line cycle can be defined as a task cycle with block size of one cache line. It, however, is much less efficient than a block size accesses, and should be limited to semaphore or mailbox operations.

Figure 3:
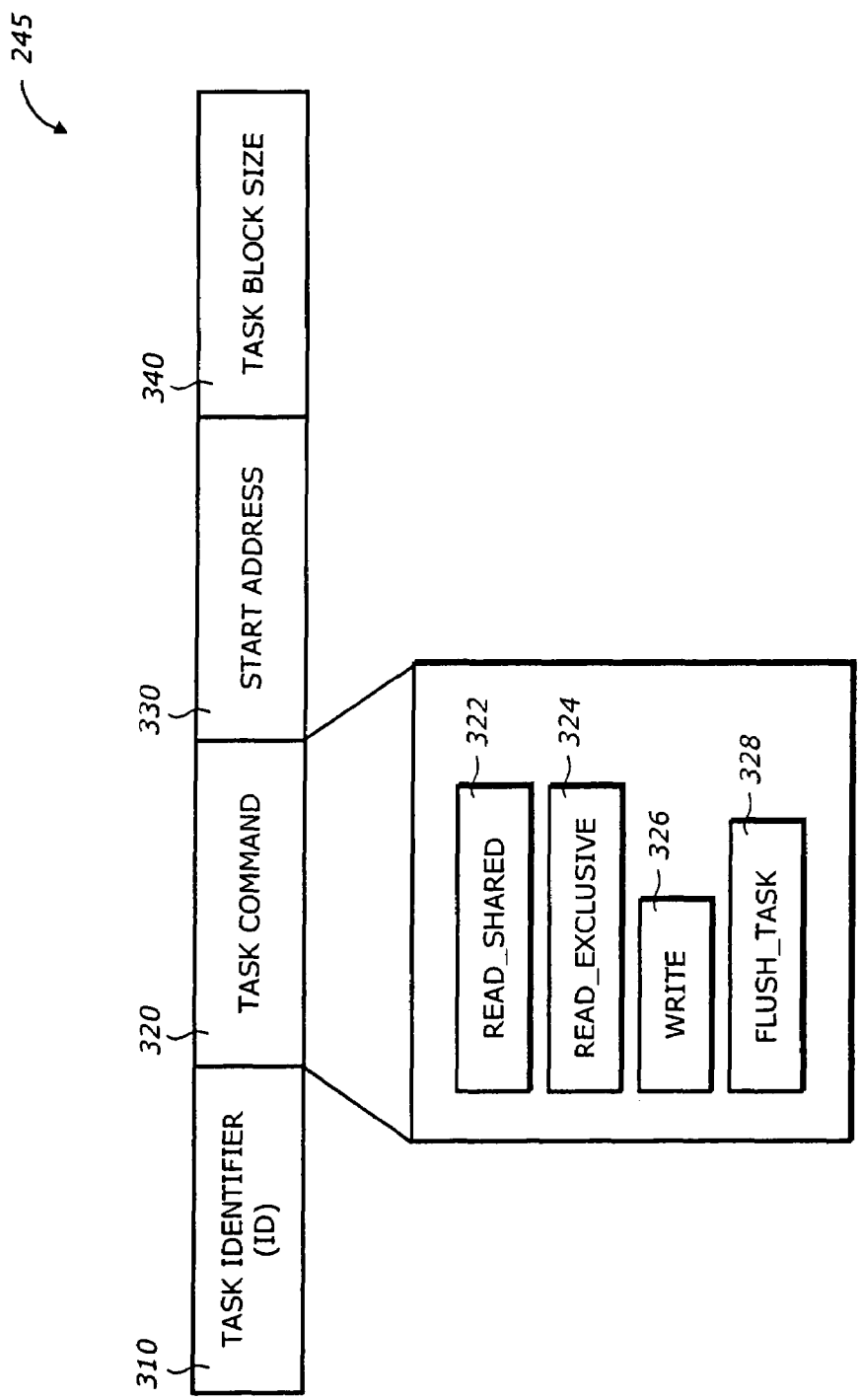
FIG. 3 is a diagram illustrating a task cycle format shown in FIG. 2 according to one embodiment of the invention.

FIG. 3 is a diagram illustrating the task cycle format 245 shown in FIG. 2B according to one embodiment of the invention. The task cycle format 245 includes a task identifier (ID) 310, a task command 320, a start address 330, and a task block size 340.

The task ID 310 is used to identify or name a task in a unique manner within a processing session. Each different task whether executed by the same processor or different processors has a different task ID. Similarly, a task may be executed by a processor or different processors but has only one unique ID. The task command 320 specifies the type of operation to be operated on a task. There may be several types of operations. In one embodiment, the task command 320 includes a read_shared command 322, a read_exclusive command 324, a write command 326, and a flush_task command 328. The read_shared command 322 is used to read a data block as shared, e.g., the data block is shared by more than one processor. The read_exclusive command 324 is used to read a data block as exclusive, e.g., the data block is used by the requesting processor exclusively. The write command 326 is used to write the data block to the main memory. For example, when the processor evicts a task that has been modified, the flush_task command 328 is used to invalidate a task. When a task is invalidated, if it contains modified data, the processor writes back all the modified cache lines in the data block to the main memory, and invalidate the task after the modified cache lines have been transferred to the main memory. If the task contains no modified data, the task is invalidated. When a task is invalidated, its task ID can be re-used.

The start address 330 specifies the starting address of the data block associated with the task. The task block size 340 specifies the size of the data block in terms of some size unit such as the cache line.

FIG. 4 is a diagram illustrating the task table 210 shown in FIG. 2A according to one embodiment of the invention. The task table 210 includes L task entries $410_1$ to $410_L$ organized into a status field 420, a task ID field 430, a start address field 440, a task block size field 450, and a cache address field 460.

Each of the task entries $410_1$ to $410_L$ contains information about a task. The status field 420 indicates the status of a task. The status may be modified, invalid, shared, and exclusive. A modified status indicates the task has been modified. An invalid status indicates that the entry in the task table is unused and its fields are invalid. A shared status indicates that the task or the data block associated with the task is shared with one or more processors. An exclusive status indicates that the task or the data block associated with the task is used exclusively by one processor. The task ID field 430 contains the task ID of the task, e.g., task ID 310. This task ID is unique to the task in the active session in which tasks are running. The start address field 440 contains the start address of the data block associated with the task, e.g., start address 330. The task block size field 450 contains the task block size, e.g., task block size 340. The cache address field 460 contains the start physical address of the cache memory that stores the data block associated with the task.

In the illustrative example shown in FIG. 4, the task entry $410_1$ has an invalid status. The task ID, start address, task block size, and cache address are don't cares and may contain any values. The task entry $410_2$ corresponds to task ID 00100 with a shared status. The start address, task block size, and the cache address of the task ID 00100 are 0100 000, 0000 1000, and 000100, respectively. Similarly, the entries $410_L$ corresponds to task ID 00080 having an exclusive status. The start address, task block size, and the cache address of the task ID 00080 are 0040 000, 0000 0100, and 006800, respectively.

The task table is typically large enough to hold sufficient number of task entries. When the number of task entries exceeds the task table size, old task entries are evicted to make room for new task entries. The cache lines associated with the evicted task are invalidated. The eviction, or replacement, of the old task entries in the task table may be performed using a number of techniques. Examples of these techniques include a first-in-first-out replacement, least recently used replacement, or any other techniques used in tag replacement. The task table may also contains the task state for scheduling purpose. The task may be in the state of ready, sleep, active, or terminated. Ready state indicates the task is ready to be executed. Sleep state indicates the task is temporally suspended until an event to wake it up. Active state means the processor is executing the task. Terminated state means the task was terminated. The task states are updated by the processor/operating system as it acquire, execute, suspend, or terminate tasks. Different algorithms can be developed to divide the processor resources to the tasks in different states.

Figure 5:
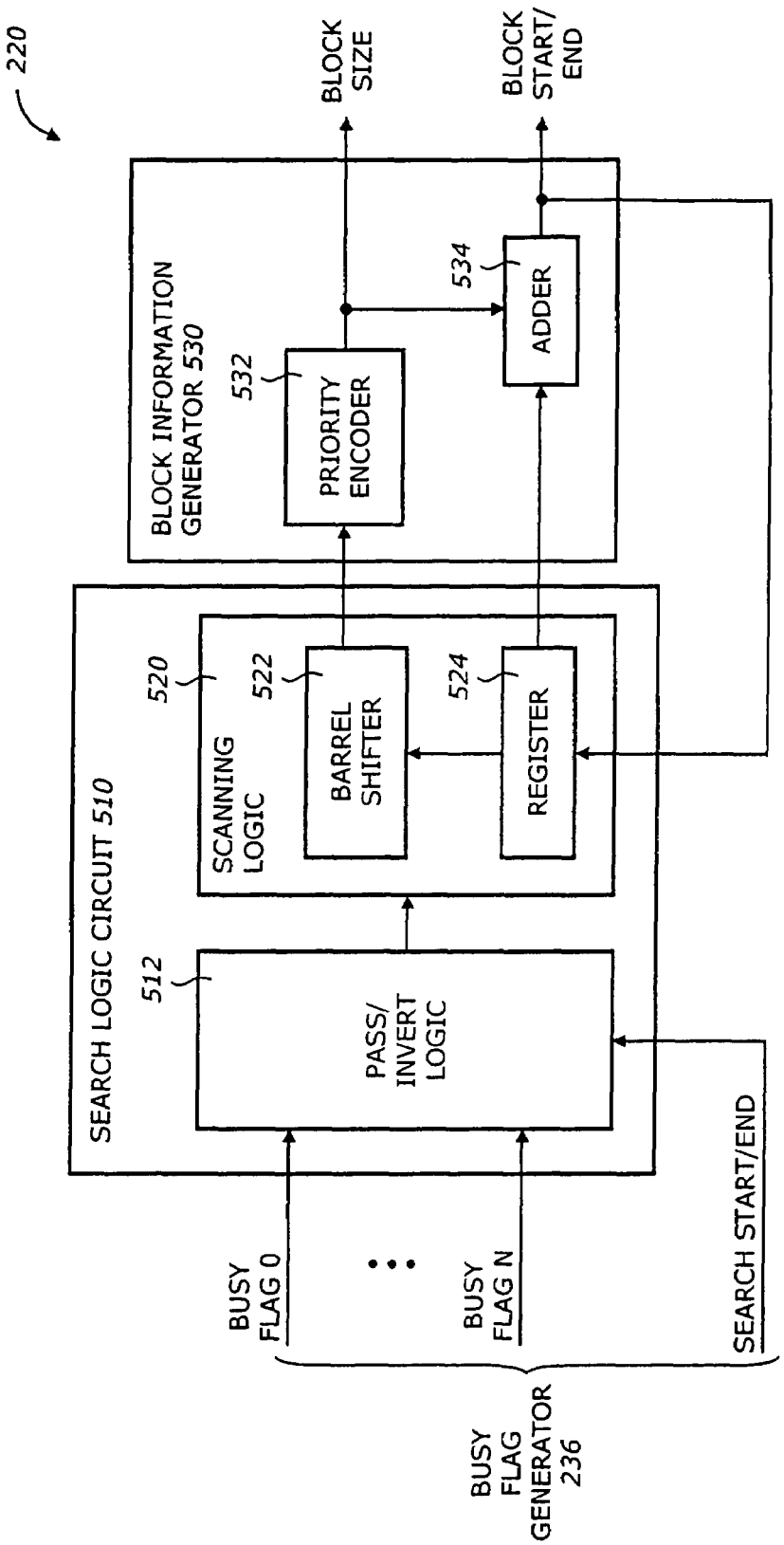
FIG. 5 is a diagram illustrating a block allocation logic shown in FIG. 2 according to one embodiment of the invention.

FIG. 5 is a diagram illustrating the block allocation circuit 220 shown in FIG. 2 according to one embodiment of the invention. The block allocation circuit 220 includes a search logic circuit 510 and a block information generator 530.

The search logic circuit 510 determines a list of candidates free blocks of memory by scanning through the busy flag signals provided by the busy flag generator 236 (FIG. 2). The busy flag indicates if the resource (e.g., memory) is busy or free. The search logic circuit 510 includes a pass/invert logic 512 and a scanning logic 520. The search starts when the search start/end signal is asserted and stops when the search start/end signal is de-asserted. The pass/invert logic 512 allows the busy flag signals to pass through or invert the polarity. The scanning logic 520 includes a barrel shifter 522 and a register 524. To spread out utilization, the flags are fed into the barrel shifter 522 for round robin prioritization. The barrel shifter 522 also rotates the flag order for the searching of the end address of the block. The block information generator 530 provides the block information such as the block size, the starting address and the ending address of the block. The block information generator 530 includes a priority encoder 532 and an adder 534. The priority encoder 532 performs the search. The adder 534 offsets the rotation of the barrel shifter 522 to give the correct start/end location of a free block. In one embodiment, the process takes two steps to find a free block. A step may correspond to a clock cycle or some predefined time interval. In the first clock, the process searches for the start address of a free block. The busy flags are inverted and rotated by the barrel shifter. The priority encoder and adder identify the start address of a free block. In the second clock, the block search logic passes the busy flags to the barrel shifter without inversion. The barrel shifter rotates the flags such that the previously found start address is in the highest priority position so that the search begins there. The priority encoder and the adder then find the end address of the free resource block; hence the block size can be determined by the difference between the start address and the end address. In this case, the block size is simply the output from the priority encoder without the offset from the adder.

Tasks in the system can be managed in several different way. The operating system may give a task to a specific processor, or by asking a free processor to grab a task. The processor that is handling the task distribution may issue a task cycle that is directed to a specific processor. The targeted processor receives the task unconditionally. By contrast, a task may be broadcasted. In this case, all processors participate in acquiring the task. Different criteria determine who will get the task. For example, each processor may contain a priority register. A task cycle is attached with a priority. The processors whose priority register values are less than the task priority are excluded from participating task acquisition. Another determining factor is the availability of free resources in the processor. Free resource may include memory space and processor availability, which affects how quickly it can respond to the task. The first responding processor, which has largest amount of free resources wins the task.

When a new task cycle is broadcast on the system bus, the first processor who determines that it can accept the task issues a task cycle in response. Upon detection of the task cycle, the other processors cancel their attempts to acquire the same task. If no processor has sufficient resource, a timer that is inverse proportional to the amount of free resource in an agent counts down. When the timer expires, the agent issues a task cycle to acquire the task. In this way the agent that has the largest amount of resource will win the task. The agent will have to evict tasks to make room for the new task. Sometimes a task may contain too large a block of data that is difficult and inefficient to handle. In this case, a large task may be divided into smaller manageable tasks by the operating system. A task cycle may be either of loading a task or of executing a task. The loading of task asks the processor to load a task into its memory. The processor is responsible to prioritized the loaded tasks and execute them. The task cycle can also be execution of a task. When the task cycle is issued, the processor/processors that contain the task are forced to execute it immediately. If no processor has the task loaded, then the processor is required to load the task and execute it.

The task cycle is divided into two phases: request phase and data phase. The data phase of the transfer may be attached with the task ID and decoupled from the request phase. In other words, there is no strict ordering of the data transfer in the request order. Task 1 may occur before task 2 but data for task 2 may occur before task 1.

When a new task is acquired, the new task information from the request phase is loaded to the L1 and L2 task tables. The processor keeps the task schedule in its task table. For example, a task tracked in the task table may have states of busy, sleep, ready, or terminated. The processor is responsible to prioritize the tasks execution. After the request phase, the data is transferred either from the main memory or from a snooping agent responding to the task cycle. L1 and L2 cache address counter are first initialized with the physical addresses of their respective free cache memory blocks. The counters are used to index to the physical locations of the cache RAMs during the data transfer. Depends on the processor design, the processor may begin executing the task before the data block transfer completes. Once the data block is in the cache RAMs, the processor can index to the L1 cache with its program or data counters as it begins to process the task. The processor may receive another request via a broadcast cycle on the multiprocessor bus for a new task already in its cache. In this case, it can respond to the request immediately by issuing a snoop response. Upon observing the snoop response, the processors do not participate in acquiring the task. Other times, requests of cached tasks may come from the task the processor is executing; then no task cycle is generated. Since the system functions based on tasks and the data blocks, the code associated with the task is most efficiently handled with relative addressing method and branching within the data block. Single cache line access is allowed in the system. This is done in the request phase of a bus cycle by the explicitly indication of single cache line access. In general, single cache line cycle never accesses the data block region. However, single cache line accesses within a task data block is still allowed provided that the final cache state is consistent with the task cache state, and that the data is always kept consistent between the single cache line cache and data block cache. For single cache lines, a small size cache RAM and tag RAM are used in the processor to track them. Due to the small size tag RAM, single cache line accesses should be avoided as much as possible, preferably restricted to mailbox communications.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a task table coupled to a bus interface to store task entries corresponding to tasks executed by at least one processor;
   a block allocation circuit coupled to the bus interface and a cache memory to allocate blocks of the cache memory used by at least one of the tasks; and
   a task coordinator to coordinate the tasks in response to a task cycle issued by the at least one processor.

2. The apparatus of claim 1 wherein each of the task entries comprises at least one of a task status, a task identifier (ID), a task start address, a task block size, and a task cache address.

3. The apparatus of claim 2 wherein the task cycle provides at least one of the task ID, a task command, the task start address, and the task block size.

4. The apparatus of claim 3 wherein the block allocation circuit comprises:
   a search logic circuit to locate a free block by shifting through a list of busy flags corresponding to data blocks in use in the cache memory; and
   a block information generator coupled to the block search logic to generate block information of a free block available for a new task, the block information including at least a block size, a block starting address, and a block ending address.

5. The apparatus of claim 1 wherein the task coordinator comprises:
   a task table updater to update the task table; and
   an address generator to generate address information to the cache memory.

6. The apparatus of claim 3 wherein the task status is one of an invalid status, a shared status, and an exclusive status.

7. The apparatus of claim 6 wherein the task command is one of a read shared command, a read exclusive command, a write command, and a flush command.

8. The apparatus of claim 7 wherein the task block size corresponds to number of cache lines in one of the blocks.

9. The apparatus of claim 8 wherein the bus interface is one of a processor bus interface and a multiprocessor bus interface.

10. The apparatus of claim 9 wherein the cache memory is one of an internal cache and an external cache with respect to the at least one processor.

11. A method comprising:
    storing task entries corresponding to tasks executed by at least one processor in a task table;
    allocating blocks of the cache memory used by at least one of the tasks; and
    coordinating the tasks in response to a task cycle issued by the at least one processor.

12. The method of claim 11 wherein each of the task entries comprises at least one of a task status, a task identifier (ID), a task start address, a task block size, and a task cache address.

13. The method of claim 12 wherein the task cycle provides at least one of the task ID, a task command, the task start address, and the task block size.

14. The method of claim 13 wherein allocating comprises:
    locating a free block by shifting through a list of busy flags corresponding to data blocks in use in the cache memory; and
    generating block information of a free block available for a new task, the block information including at least a block size, a block starting address, and a block ending address.

15. The method of claim 11 wherein coordinating the tasks comprises:
    updating the task table; and
    generating address information to the cache memory.

16. The method of claim 13 wherein the task status is one of an invalid status, a shared status, and an exclusive status.

17. The method of claim 16 wherein the task command is one of a read shared command, a read exclusive command, a write command, and a flush command.

18. The method of claim 17 wherein the task block size corresponds to number of cache lines in one of the blocks.

19. The method of claim 18 wherein the bus interface is one of a processor bus interface and a multiprocessor bus interface.

20. The method of claim 19 wherein the cache memory is one of an internal cache and an external cache with respect to the at least one processor.

21. A system comprising:
    a processor bus; and
    a plurality of processors coupled to the processor bus, each of the plurality of processors having an internal task manager and an internal cache memory, the internal task manager comprising:
       a task table coupled to a bus interface to store task entries corresponding to tasks executed by at least one processor,
       a block allocation circuit coupled to an internal bus interface and the interval cache memory to allocate blocks of the interval cache memory used by at least one of the tasks, and
       a task coordinator to coordinate the tasks in response to a task cycle issued by the at least one processor.

22. The system of claim 21 wherein each of the task entries comprises at least one of a task status, a task identifier (ID), a task start address, a task block size, and a task cache address.

23. The system of claim 22 wherein the task cycle provides at least one of the task ID, a task command, the task start address, and the task block size.

24. The system of claim 23 wherein the block allocation circuit comprises:
    a search logic circuit to locate a free block by shining through a list of busy flags corresponding to data blocks in use in the internal cache memory; and
    a block information generator coupled to the block search logic to generate block information of a free block available for a new task, the block information including at least a block size, a block starting address, and a block ending address.

25. The system of claim 21 wherein the task manager comprises:

a task table updater to update the task table; and an address generator to generate address information to the interval cache memory.

26. The system of claim 23 wherein the task status is one of an invalid status, a shared status, and an exclusive status.

27. The system of claim 26 wherein the task command is one of a read shared command, a read exclusive command, a write command, and a flush command.

28. The system of claim 27 wherein the task block size corresponds to number of cache lines in one of the blocks.

29. The system of claim 28 wherein the processor bus is a multiprocessor bus.

30. The system of claim 29 further comprising:

a external cache memory; and an external task manager coupled to the external cache memory and the processor bus, the external task manager comprising:

an external task table to store task entries corresponding to tasks executed by at least one processor, a external block allocation circuit coupled to the processor bus and the external cache memory to allocate blocks of the external cache memory used by the tasks, and an external task coordinator to coordinate the tasks in response to the task cycle issued by the at least one processor.

\* \* \* \* \*

UNITED STATES PATENT AND TRADEMARK OFFICE
CERTIFICATE OF CORRECTION

PATENT NO. : 7,028,299 B1 Page 1 of 1
APPLICATION NO. : 09/608869
DATED : April 11, 2006
INVENTOR(S) : Chang It is certified that error appears in the above-identified patent and that said Letters Patent is hereby corrected as shown below:

In column 10, at line 60, delete "shining" and insert --shifting--.

Signed and Sealed this

Fourth Day of July, 2006

JON W. DUDAS
*Director of the United States Patent and Trademark Office*